UNITED STATES PATENT OFFICE.

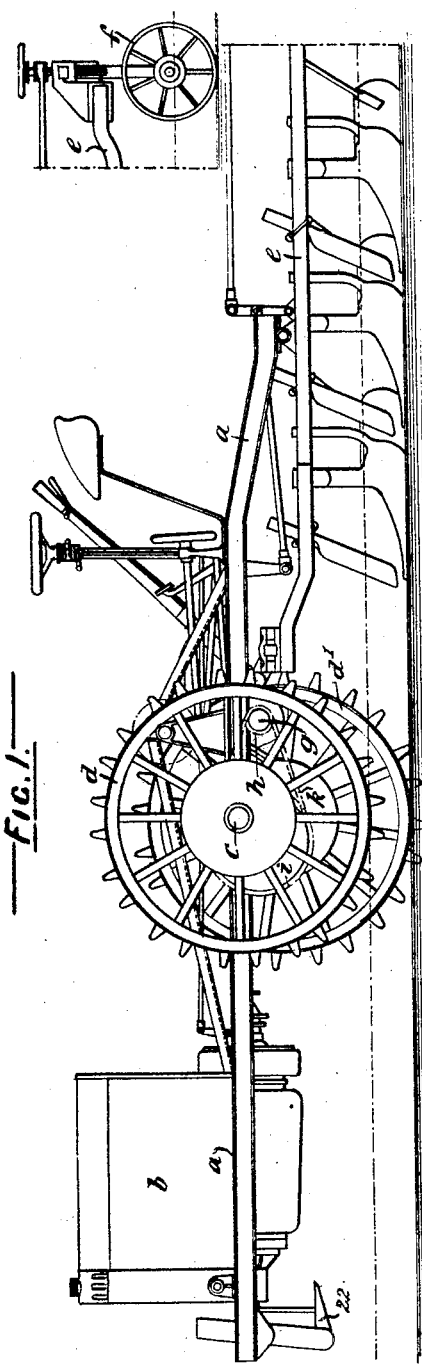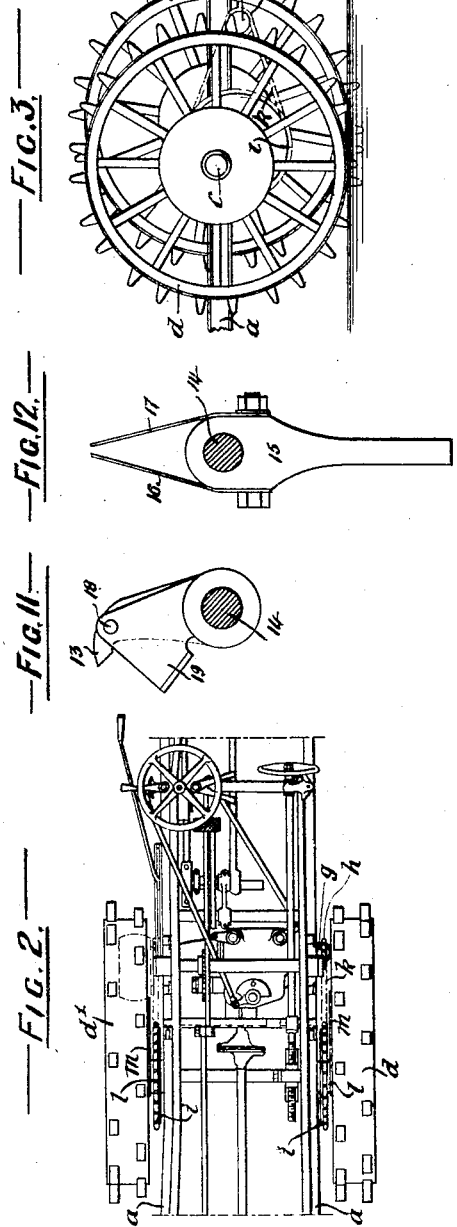

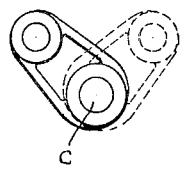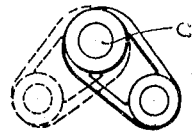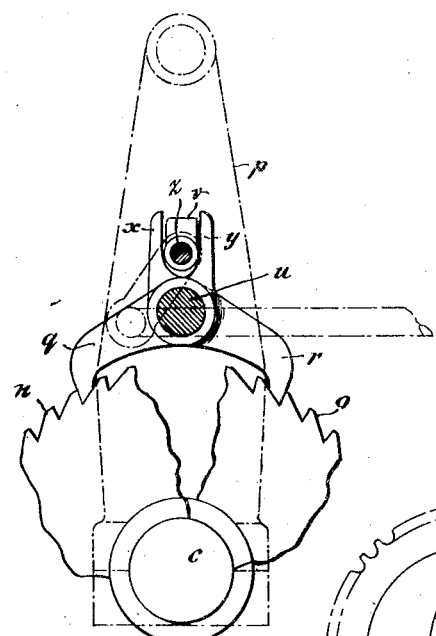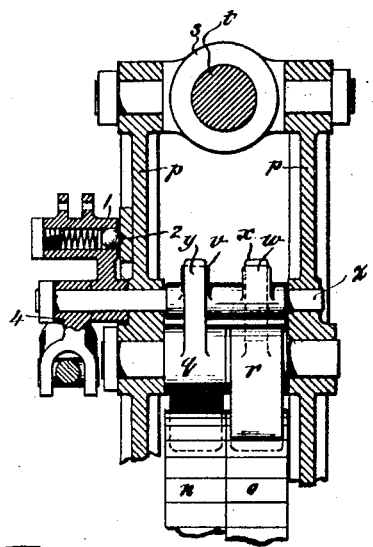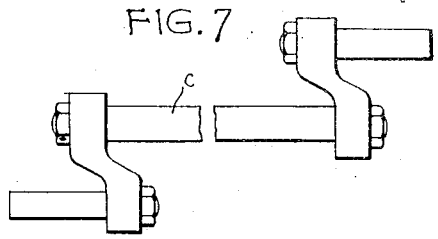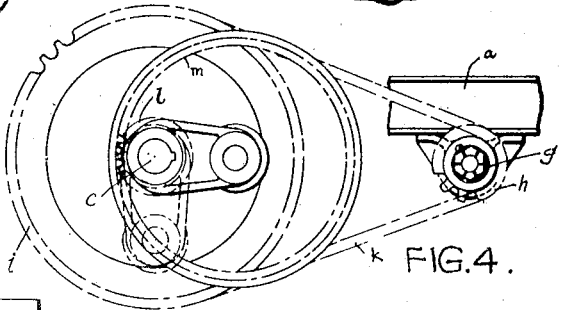

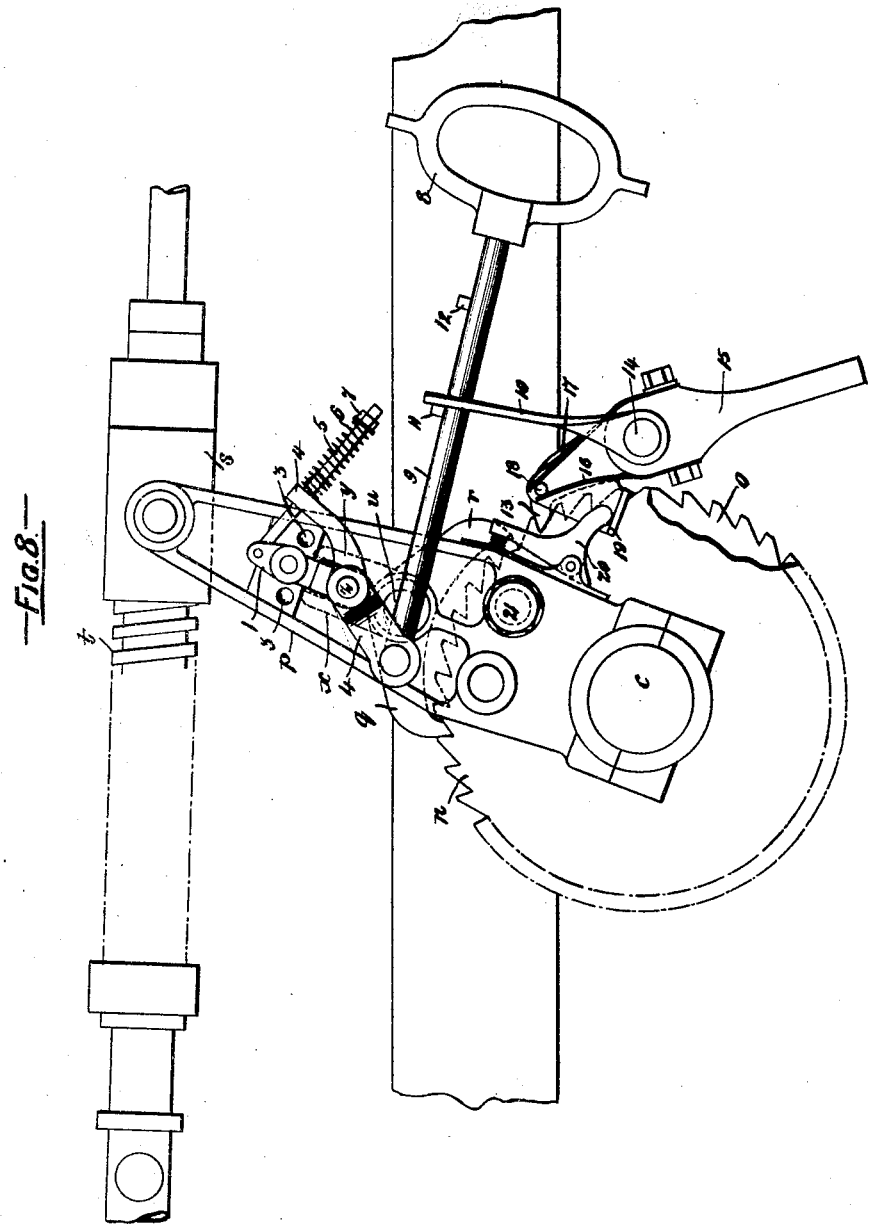

EDWARD WILLIAM THOMAS, OF LUTON, ENGLAND.

SELF-PROPELLED AGRICULTURAL IMPLEMENT.

1,336,057.  Specification of Letters Patent.  Patented Apr. 6, 1920.

Application filed April 17, 1918. Serial No. 229,078.

*To all whom it may concern:*

Be it known that I, EDWARD WILLIAM THOMAS, engineer, a subject of the King of Great Britain, and resident of Biscot Road, Luton, Bedfordshire, England, have invented new and useful Improvements in Self-Propelled Agricultural Implements, of which the following is a specification:

The present invention has reference to self propelled agricultural implements, particularly plows propelled by internal combustion engines carried on the framing.

According to this invention the driving or road wheels by which the implement is propelled are mounted loosely on stub axles extending laterally from cranks fixed to an axle extending across the frame of the machine. The cranks which carry the stub axles do not as is usual in cranked axles, extend both in the same direction. They may in an exaggerated case extend in diametrically opposite directions but it is preferred that they should make between them when the axle is inspected from one end, an angle approximating 90°. It will thus be seen that on the cranked axle being turned on its axis, the wheels mounted on the stub axles will be raised or lowered relatively to one another and to the framing. This will enable one wheel to run in a furrow while the other runs on higher land, the framing mentioned remaining horizontal or nearly so. It will also enable the machine to run level on level ground either with the shares elevated off the ground or embedded therein according to the downward or upward direction of the cranks. The wheels are one in advance of the other when running level to a degree determined by the length of and the angle between the cranks. The position of their centers either above or below the main portion of the axle will determine the height of the frame relatively to the wheels; the position being reversed to the full extent by turning the axle through 180°.

The angle of 90° between the cranks is preferred because with this angle it is possible to obtain the maximum vertical adjustment of the land wheel in conjunction with the minimum adjustment of the furrow wheel, that is when the crank of the furrow wheel takes up approximately a vertical downward position and that of the land wheel approximately a horizontal position. So disposed it is only necessary to make provision for very slightly rectifying the position of the plow relative to the main frame for different depths of plowing.

The road wheels are each separately driven by a train of gearing arranged radially between the main portion of the cranked axle and a gear wheel or ring of teeth on the running wheel fixed co-axially to the latter. A sprocket or gear wheel on the main axle fast with the first member of the train will impart the requisite rotary motion derived in any suitable way from the engine. There is furnished a gear box of the ordinary type which will enable either road wheel to be driven separately or both together. The radial arrangement of the train of gearing will enable the road wheels to remain in driving engagement irrespective of their positions relative to one another and to the framing.

The cranked axle is rotated on its axis for the purpose of shifting the position of the cranks by means of a ratchet mechanism with pawls operating in opposite directions enabling the axle to be rotated in either direction.

The pawls, which are not required to be in operation simultaneously except when used to lock the axle in the adjusted position, are provided with tail pieces controlled by means of a cam, permitting the pawls to be in operation separately or simultaneously as required, and may be pivoted on a pin with bearing surfaces eccentric to each other and also eccentric to the axis of rotation of the pin, allowing the centers of the pawls to be separated and by this means locking the axle against rotary motion when the road wheels have been adjusted to the elevation and position desired.

The pin carrying the pawls is mounted in a reciprocating arm or arms fulcrumed on the main portion of the cranked axle the reciprocating arms receiving the requisite movements from a nut and screw or other suitable mechanism.

The cultivating tools, say the shares of a plow, are preferably mounted on a framing pivoted to the main framing to facilitate rectification relatively to the furrow wheel and adjustment of the depth of the furrows and to permit of detachment.

The location of the pivot is forward of the center of gravity of the plow shares and their framing, consequently the weight of the parts forward of the driving wheels is utilized to raise the front end of the pivoted plow frame using the rear wheel of the latter as a fulcrum.

A steering wheel adjustable in height at the rear is controlled by link mechanism from the driver's seat. There is a shoe or skid in front which is normally clear of the ground but which will be brought into contact therewith and act as a check on the tilting of the machine in a forward direction when turning at the headlands.

The shoe or skid is made adjustable as it is preferred that its position relative to the main frame be varied to suit different depths of furrow.

When running on the road on the way to work, the cranks will be turned down to bring the wheels to the same level and to lift the frame relatively to the said wheels. This will suffice to clear the shares from the ground but in addition if desired the pivoted frame carrying them may be independently lifted. To plow the first furrow the axle is turned to bring the cranks upward and lower the frame, still keeping the implement on a level base, or alternatively the frame is lowered and the plow on the land side set so as to cut furrows gradually increasing in depth until the required depth is obtained. For subsequent plowing the axle is turned to bring the cranks and the road wheels thereon to different levels so that one wheel will run in a furrow and one on higher ground. To turn at the end of the furrows one road wheel is driven in a backward direction, the other being released from the drive.

The effect is to rock the machine around the driving wheels until the front skid is in contact with the ground and the plow shares raised sufficiently to clear the top of the furrows; the power of the engine then asserts itself until the tractive resistance is overcome and the driven wheel carries the implement with lifted shares around the undriven wheel and turns the implement in a very short length which permits of short headlands at the ends of the field.

This rocking motion is obtained from the reaction of the drive due to the tractive resistance being greater than the resistance offered by the counter balancing weight of the machine.

This rocking motion is also used when it is required to back the machine when plowing and is of great assistance in the clearing away of twitch and other obstructions which choke the implement.

In carrying out the turning operation in the manner above explained no interference whatever is made with the adjustment and setting of the position of the driving and steering wheels so that these are always in their correct position for re-commencing plowing.

If the pivoted frame carrying the shares or the like is removed, the machine can be used as a tractor, but in that case, the axle of the road wheels should be bodily moved farther aft and a wheel added forward instead of the shoe to maintain the equilibrium of the machine after the pivoted frame has been removed.

The accompanying drawings illustrate a motor plow embodying the present invention.

Figure 1 is a general side elevation showing the crank axles in the position giving the maximum variation in height of the driving wheels.

Fig. 2 is a plan view illustrating the middle part of the machine.

Fig. 3 is a side view of the running wheels detached.

Fig. 4 is a side view of the drive for one of the running wheels.

Figs. 5 and 6 are end views of the cranked axle in reversed positions in accordance with the lowest and highest positions respectively of the wheels relatively to the frame.

Fig. 7 shows in plan the cranked axle detached.

Fig. 8 shows in side view enlarged the ratchet mechanism for turning the cranked axle.

Figs. 9 and 10 are detached front and side views showing more particularly the pawls and means for operating them.

Figs. 11 and 12 are detail views hereinafter referred to.

$a$ is the main framing which carries the engine $b$, cranked axle $c$, road or running wheels $d$ $d'$, driving shaft $g$ gear box and various levers, handles and connections for manipulating the machine.

To the rear of the frame $a$ is pivoted the plow $e$ having a steering wheel $f$.

The plow can be detached when desired and the main part of the machine used as a tractor for purposes other than plowing.

On the removal of the plow it may be necessary to shift the road wheels to the rear to reëstablish the equilibrium of the machine, when the weight of the plow is removed.

The axle $c$ which extends from side to side of the framing has its ends cranked and the cranked portions extend in different directions (see Figs. 5, 6 and 7). On stub axles mounted on the cranked ends of the axle are loosely mounted the wheels $d$ $d'$. The axle itself is mounted in bearings and is normally stationary but it is capable of being rotated under control to bring the wheels $d$ $d'$ to different positions. In Fig. 1 the wheel $d$ is higher than the wheel $d'$. In Fig. 3 they are on the same level but the wheel $d$ is in advance of $d'$. If desired a further turn of the axle will bring the wheel $d$ below the level of the wheel $d'$. The cranks may be turned either up or down (see Figs. 5 and 6) to lower or raise the frame relatively to the wheels.

There is much mechanism which is merely indicated in the drawings but which as it has no direct bearing on the invention it will not be necessary to describe.

The drive is imparted separately to the wheels $d$ $d'$ by means of chains and sprockets. The drive is the same on both sides and is derived from the shaft $g$ which is fitted with clutches of any convenient kind to drive both sides alike or to vary or disconnect the drive as required in a way that is well understood. This being so it will be sufficient to describe the drive on one side only (see Fig. 4). On the shaft $g$ is the sprocket $h$ and loose on the main portion of the axle $c$ is the sprocket $i$. $k$ is a chain imparting the drive from one to the other. In one with the sprocket $i$ is a pinion $l$ which engages with the internal teeth of the ring $m$ fast to the road wheel and mounted coaxially therewith. It will thus be seen that the rotation of the axle $c$ to raise or lower the wheels will not disengage the drive.

To rotate the axle $c$ to raise or lower the wheels the following device is employed:

A drum provided with two rings of oppositely arranged ratchet teeth $n$ $o$ (see Fig. 8) is fixed to the said axle. Loosely mounted on the same axle is the reciprocating arm or lever frame $p$ carrying in the manner about to be described the pawls $q$ $r$ and connected with the nut $s$ on a screw shaft $t$ by means of which the lever $p$ can be rocked in either direction. The pawls $q$ $r$ are loosely mounted on the spindle $u$ within the lever $p$ and are furnished with tails $x$ $y$ bearing in opposite directions against the cams $v$ $w$ on the spindle $z$.

The spindle $z$ is rotatable in bearings in the lever $p$ and has fast upon it a lever 1 provided with a spring catch 2 adapted to engage with one of three depressions 3 on the lever $p$ (see Fig. 8) and hold the lever 1 in one of three positions. Loose upon the shaft $z$ is a rocking lever 4 the upper limb of which is strung onto a rod 5 pivoted to the lever 1 and having on it a spring 6 interposed between the lever 4 and the adjustable stop 7. The lower arm of the lever 4 is connected by a universal joint and by the rod 9 to the handle 8. The rod 9 is adapted to slide through a stationary support 10 and is provided with stops 11 and 12. When the stops 11 and 12 are turned downward they will freely pass through the support 10 but when turned upward as in Fig. 8 they will strike against the support 10 and thus limit the endwise movement of the handle 8. 13 is a pawl adapted to engage with the teeth $n$. This pawl 13 is mounted on a stationary pivot 14 upon which also rocks a hand lever 15 (see Figs. 11 and 12). An engagement is effected between the hand lever 15 and the pawl 13 by means of springs 16, 17 carried by the lever and bearing on opposite sides of the pin 18 near the end of the pawl 13 (see Fig. 8). The pawl 13 has fixed upon it the plate 19 which is adapted to meet the spring supported trigger 20 pivoted on the side of the lever $p$.

In practice it is sufficient to permit only a partial rotation of the axle and to obtain the highest and lowest positions of the frame by a reciprocatory rotary movement sufficient in extent to provide the maximum position in either direction as well as any intermediate position that may be necessary.

Suppose it be desired to lower the frame relatively to the wheels in which case it is necessary to control the tendency of the frame to descend under its own weight. It will first be necessary to rock the lever 15 to the right as shown in Fig. 8 so as to engage the pawl 13 with the teeth of the ratchet $n$. The pawl 13 will then take the weight of the frame. The handle 8 is then turned to bring the stops 11 and 12 upward (see Fig. 8). An endwise movement of the handle 8 toward the left will, through the lever 4, rod 5 spring 6 and lever 1 rock the spindle $z$ and lift the pawl $q$ by the cam $v$ clear of the teeth of the ratchet drum $n$ the right hand depression 3 serving to retain the lever 1 and other parts until moved again as explained later.

The lever 15 is then returned to its former position so as to give the pawl 13 a tendency to release itself from the ratchet teeth by means of the spring on the left side but it does not actually do so so long as it takes the weight of the machine by reason of the slight undercut of the teeth.

The lever $p$ by means of its screw can then be put over to the left (Fig. 8) until the handle 8 drawn in the same direction brings the stop 12 against the support 10. The effect of this is to cause the tail of the lever 4 to strike the lever 1, bring it to its central position as in Fig. 8 and thereby turn the spindle $z$ and cam $v$ back and allow the pawl $q$ to reëngage and ease the pawl 13 from the weight it supports.

When relieved of the load the pawl 13 disengages itself and the screw mechanism is free to lower the frame by means of the pawl $q$. This goes on until the spring supported trigger 20 strikes the plate 19 and brings the pawl 13 back again into engagement with the ratchet teeth. Simultaneously the stop 11 strikes the support 10. The effect of this is to cause the compression of the spring 6 by means of the lever 4 which is caused by the resistance of the handle to rock while the lever $p$ continues to move to the right, a movement which is permitted to a limited extent by reason of the fact that the trigger 20 is capable of a slight yield owing to its spring. When the pawl 13 has taken up the load and the spring 6 has been sufficiently compressed, the force of the latter is exerted on the lever 1 and the latter through the cam $v$ effects the release of the pawl $q$ by pulling the rod 5 from left to right and moving the lever 1 in the same direction. A reversal of the controlling screw will move the pawl $q$ to a fresh position and the operation will be repeated until the required height is established.

The frame may be lifted by putting the lever 15 to the right to engage the pawl 13, and turning over the handle 8 so that the stops will pass freely through the support 10. The handle 8 is then pulled to the right which by means of the lever 4 which acts against the lever 1 and cam $w$ lifts the pawl $r$ clear of the ratchet $o$. The pawl $r$ is used to turn the axle when it has to be turned in a direction contrary to that above mentioned without the assistance of the load.

A safety locking pin 21 is provided for fixing the lever $p$ to the ratchet drum thereby locking the axle against rotation when the parts have been adjusted to the proper height.

As an alternative locking device the two pawls $q$ and $r$ may be mounted eccentrically on their spindle as stated earlier in the specification in which case a slight rotation of the spindle in the proper direction will spread the pawls and engage them both firmly in opposite directions with their respective ratchets.

22 is a shoe or skid appearing in Fig. 1 to take the weight of the fore part of the machine on the ground in the manner mentioned earlier in the specification.

The operation of turning the machine by the reaction of the backward drive of one wheel while the other is loose has already been described earlier in the specification. The raising of the rear and the depression of the front is dependent on the proper distribution of the weights before and behind the running wheels.

The operation is greatly facilitated by the employment of the cranked axle which on being turned will throw the center of gravity a little distance toward the front. Shifting the weight backward is likewise of advantage when the implement is plowing.

For traveling on the road the weight is best thrown back. Fig. 5 gives the position of the cranks for traveling on the road as a tractor. Fig. 6 gives the position for traveling on the road with the plow attached. In both these positions the center of support is through the shaft $c$. In Fig. 4 which shows the plowing position the center of support is the mean between the wheel center on the pendent crank and the wheel center on the horizontal crank viz: some distance to the rear of the axle shaft $c$.

What I claim and desire to secure by Letters Patent of the United States is:—

1. In a self propelled agricultural implement, an axle for the running wheels which is cranked in different directions at its opposite ends so that the wheels mounted on the cranked portions which are rigid with the main portion will be raised or lowered relatively to each other and to the framing when the axle is rotated, and means for rotating the axle to adjust the position of the wheels relatively to the frame and to each other, which means comprises a ratchet drum fixed on the axle provided with a double row of oppositely arranged teeth, a lever fulcrumed loosely on the main portion of the axle, a pair of pawls to engage with the said rows of teeth pivoted on the said lever, means for engaging and disengaging the pawls from their respective rows of teeth and means for locking the axle against rotation when required.

2. In a self propelled agricultural implement, an axle for the running wheels which is cranked in different directions at its opposite ends so that the wheels mounted on the cranked portions which are rigid with the main portion will be raised or lowered relatively to each other and to the framing when the axle is rotated, and means coöperating therewith for lifting and lowering the frame comprising a ratchet drum fixed on said axle, a spring controlled retaining pawl for the drum regulatable by hand and adapted to be automatically disengaged and reengaged as may be required on being relieved of its load and on having to reassume it.

In testimony whereof I have signed my name to this specification in the presence of two subscribing witnesses.

EDWARD WILLIAM THOMAS.

Witnesses:
   ALFRED V. BISHOP,
   MAX. C. HOFMANN.